(12) United States Patent
Okugawa

(10) Patent No.: US 7,312,920 B2
(45) Date of Patent: Dec. 25, 2007

(54) CONFOCAL MICROSCOPE

(75) Inventor: Hisashi Okugawa, Yokosuka (JP)

(73) Assignee: Nikon Corporation, Tokyo (JP)

( * ) Notice: Subject to any disclaimer, the term of this patent is extended or adjusted under 35 U.S.C. 154(b) by 48 days.

(21) Appl. No.: 11/232,033

(22) Filed: Sep. 22, 2005

(65) Prior Publication Data

US 2006/0066944 A1 Mar. 30, 2006

(30) Foreign Application Priority Data

Sep. 24, 2004 (JP) ............................ 2004-277734

(51) Int. Cl.
*G02B 21/00* (2006.01)

(52) U.S. Cl. ....................... 359/368; 359/217; 250/236

(58) Field of Classification Search ..................... None
See application file for complete search history.

(56) References Cited

U.S. PATENT DOCUMENTS

| | | | | |
|---|---|---|---|---|
| 4,241,257 A | * | 12/1980 | Koester | ...................... 250/235 |
| 4,845,352 A | * | 7/1989 | Benschop | ................. 250/201.7 |
| 5,428,475 A | | 6/1995 | Tanaami et al. | ............. 359/368 |
| 5,579,157 A | | 11/1996 | Tanaami et al. | ............. 359/368 |
| 5,767,962 A | * | 6/1998 | Suzuki et al. | ............. 356/237.2 |
| 6,856,457 B2 | * | 2/2005 | Vogt et al. | ................... 359/389 |

FOREIGN PATENT DOCUMENTS

| | | |
|---|---|---|
| JP | 5-45600 | 2/1993 |
| JP | 2663780 | 6/1997 |

* cited by examiner

*Primary Examiner*—Stephone B. Allen
*Assistant Examiner*—Derek S. Chapel
(74) *Attorney, Agent, or Firm*—Miles & Stockbridge P.C.

(57) ABSTRACT

A confocal microscope including a first condenser optical system that condenses light from a light source onto a sample; a pinhole member having a pinhole; a second condenser optical system that condenses light from the sample into the pinhole; a polygon mirror having a plurality of mirror surfaces achieving angles relative to a rotational axis different from one another and formed so as to surround the rotational axis in a full circle, which is disposed between the first condenser optical system and the pinhole; and a first optical system that separates the light from the light source and the light from the sample and guides the light from the sample departing the polygon mirror to the pinhole.

7 Claims, 8 Drawing Sheets

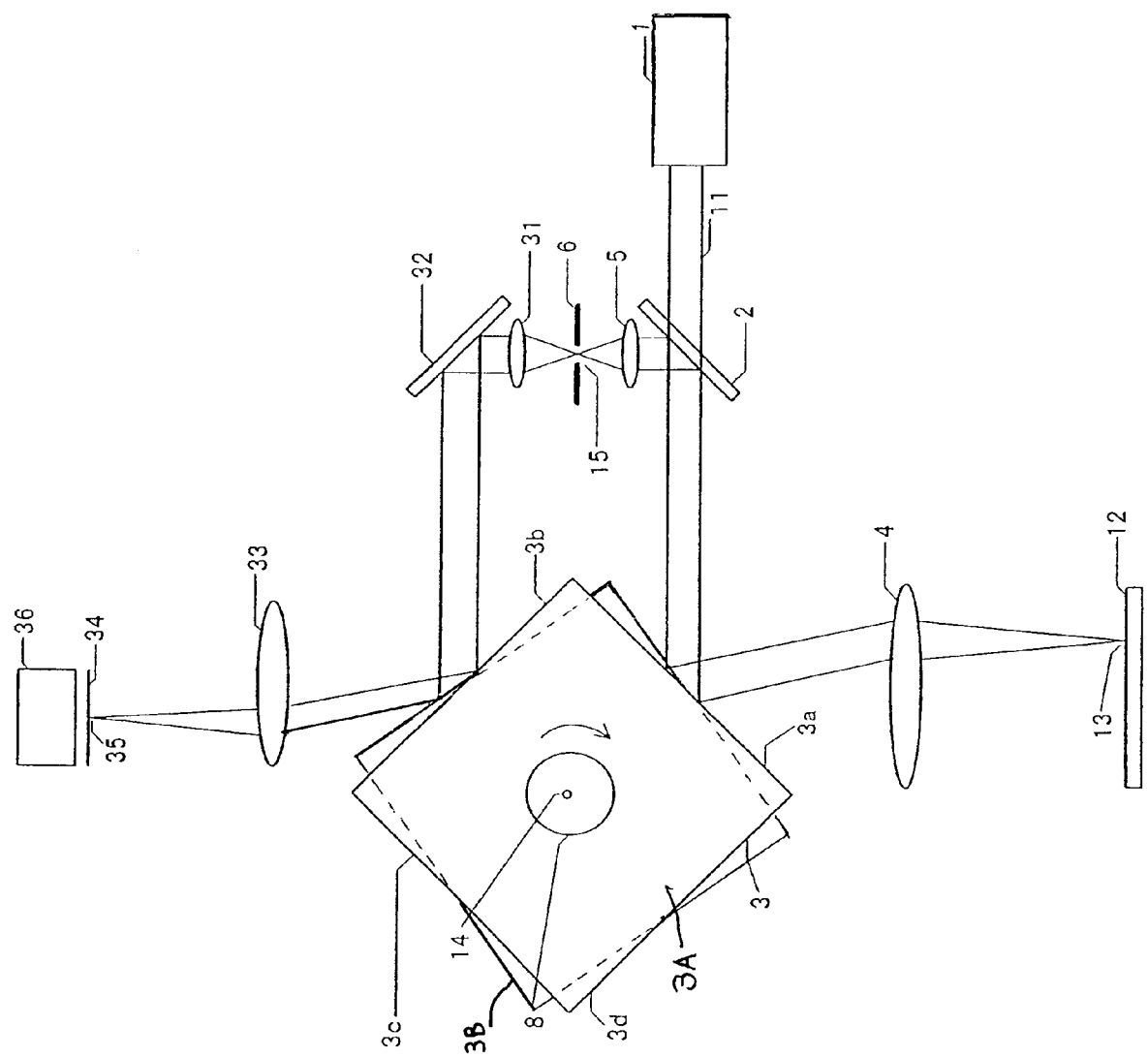

CONFOCAL MICROSCOPE

INCORPORATION BY REFERENCE

The disclosure of the following priority application is herein incorporated by reference: Japanese Patent Application No. 2004-277734 filed Sep. 24, 2004

BACKGROUND OF THE INVENTION

1. Field of the Invention

The present invention relates to a confocal microscope.

2. Description of Related Art

A light scanner for confocal system adopting a disk rotation system that utilizes a pinhole member having a plurality of pinholes formed therein is used in conjunction with a confocal microscope in the related art (see Japanese Patent Gazette No. 2663780). In addition, there is a polygon mirror apparatus known in the related art that allows laser light to be used directly for raster scanning with the single polygon mirror (see Japanese Laid Open Patent Publication No. H5-45600).

SUMMARY OF THE INVENTION

The light scanner for confocal system disclosed in Japanese Patent Gazette No. 2663780 adopts a structure that allows laser light having been condensed with the individual lenses disposed at a condenser disk to pass through the pinholes formed at the pinhole disk. However, since the lenses and the pinholes are two-dimensionally formed on the disks, a problem arises during the manufacturing process in that the alignment of the two disks is extremely difficult. This problem is addressed by setting the size of the pinholes at least twice as large as the size of the light spots condensed through the condenser lenses. However, large-size pinholes lower the sectioning resolution, giving rise to a problem in that the full advantage of confocal scanning cannot be achieved. There is an added problem in that the size of the pinholes cannot easily be changed as necessary.

According to the 1st aspect of the invention, a confocal microscope comprises: a first condenser optical system that condenses light from a light source onto a sample; a pinhole member having a pinhole; a second condenser optical system that condenses light from the sample into the pinhole; a polygon mirror having a plurality of mirror surfaces achieving angles relative to a rotational axis different from one another and formed so as to surround the rotational axis in a full circle, which is disposed between the first condenser optical system and the pinhole; and a first optical system that separates the light from the light source and the light from the sample and guides the light from the sample departing the polygon mirror to the pinhole.

According to the 2nd aspect of the invention, in the confocal microscope according to the 1st aspect, it is preferred that: the polygon mirror rotates around the rotational axis at a constant speed, sequentially reflects the light from the light source at the plurality of mirror surfaces and guides the reflected light to the first condenser optical system, and two-dimensionally scans the sample with the light condensed onto the sample by the first condenser optical system; the first condenser optical system guides the light from the sample to the polygon mirror; and the polygon mirror reflects the light from the sample departing the first condenser optical system at a mirror surface matching a mirror surface at which the light from the light source has been reflected, and guides the reflected light to the second condenser optical system.

According to the 3rd aspect of the invention, in the confocal microscope according to the 2nd aspect, it is preferred that there are further provided a light detector that detects the light condensed at the pinhole and a sample image generating device that generates a two-dimensional image of the sample based upon the light detected by the light detector and a rotational position of the polygon mirror.

According to the 4th aspect of the invention, in the confocal microscope according to the 3rd aspect, it is preferred that: a plurality of condensed light spots are formed on the sample with the light from the light source; and the pinhole member includes a plurality of pinholes each used in correspondence to one of the plurality of condensed light spots.

According to the 5th aspect of the invention, in the confocal microscope according to the 4th aspect, it is preferred that the plurality of condensed light spots and the plurality of pinholes are set substantially parallel to the rotational axis of the polygon mirror.

According to the 6th aspect of the invention, in the confocal microscope according to the 4th aspect, it is preferred that the polygon mirror is structured so that when a scan achieved with the plurality of condensed light spots shifts by one stage as the polygon mirror rotates and light reflection switches from a mirror surface to an adjacent mirror surface, the plurality of condensed light spots shift by an extent represented by a distance smaller than a distance between adjacent condensed light spots.

According to the 7th aspect of the invention, in the confocal microscope according to the 2nd aspect, it is preferred that: there are further provided a second optical system that guides the light from the sample, having passed through the pinhole, to the polygon mirror, and a third condenser optical system that condenses the light from the sample, having passed through the pinhole and having been guided from the polygon mirror, onto a specific plane; and the polygon mirror sequentially reflects the light from the sample, guided back to the polygon mirror from the second optical system after passing through the pinhole, at the plurality of mirror surfaces and guides the reflected light to the third condenser optical system as the polygon mirror rotates, so as to enable a two-dimensional scan of the specific plane with the light condensed onto the specific plane by the third condenser optical system and optically generate a two-dimensional image of the sample on the specific plane.

According to the 8th aspect of the invention, in the confocal microscope according to the 7th aspect, it is preferred that there is further provided a two-dimensional detector that detects a two-dimensional image of the sample formed on the specific plane.

According to the 9th aspect of the invention, in the confocal microscope according to the 7th aspect, it is preferred that the polygon mirror reflects the light from the light source and the light from the sample at a same mirror surface.

According to the 10th aspect of the invention, in the confocal microscope according to the 9th aspect, it is preferred that: a plurality of condensed light spots are formed on the sample with the light from the light source; and the pinhole member includes a plurality of pinholes each used in correspondence to one of the plurality of condensed light spots.

According to the 11th aspect of the invention, in the confocal microscope according to the 10th aspect, it is preferred that the plurality of condensed light spots and the plurality of pinholes are set substantially parallel to the rotational axis of the polygon mirror.

According to the 12th aspect of the invention, in the confocal microscope according to the 10th aspect, it is preferred that the polygon mirror is structured so that when a scan achieved with the plurality of condensed light spots shifts by one stage as the polygon mirror rotates and light reflection switches from a mirror surface to an adjacent mirror surface, the plurality of condensed light spots shift by an extent represented by a distance smaller than a distance between adjacent condensed light spots.

According to the 13th aspect of the invention, in the confocal microscope according to the 7th aspect, it is preferred that the polygon mirror includes two mirror surface sets disposed along the rotational axis, each having a plurality of mirror surfaces set so as to surround the rotational axis in a full circle, reflects incoming light from the light source at a mirror surface in a first set and reflects the light from the sample at a mirror surface in a second set, with the first set and the second set coupled so as to offset the plurality of mirror surfaces in the first set and the plurality of mirror surfaces in the second set along a rotational direction to use mirror surfaces in the first set and the second set achieving angles equal to each other relative to the rotational axis.

According to the 14th aspect of the invention, in the confocal microscope according to the 7th aspect, it is preferred that: a plurality of condensed light spots are formed on the sample with the light from the light source; and the pinhole member includes a plurality of pinholes each used in correspondence to one of the plurality of condensed light spots.

According to the 15th aspect of the invention, in the confocal microscope according to the 14th aspect, it is preferred that the plurality of condensed light spots and the plurality of pinholes are set substantially parallel to the rotational axis of the polygon mirror.

According to the 16th aspect of the invention, in the confocal microscope according to the 2nd aspect, it is preferred that: a plurality of condensed light spots are formed on the sample with the light from the light source; the pinhole member includes a plurality of pinholes each used in correspondence to one of the plurality of condensed light spots; and there are further provided a plurality of light detectors that detect the light condensed at the plurality of pinholes, and a sample image generating device that generates a two-dimensional image of the sample based upon the light detected by the light detectors and a rotational position of the polygon mirror.

BRIEF DESCRIPTION OF THE DRAWINGS

FIG. 4A shows a modification of the structure shown in FIG. 4;

DESCRIPTION OF PREFERRED EMBODIMENTS

First Embodiment

Figure 1:
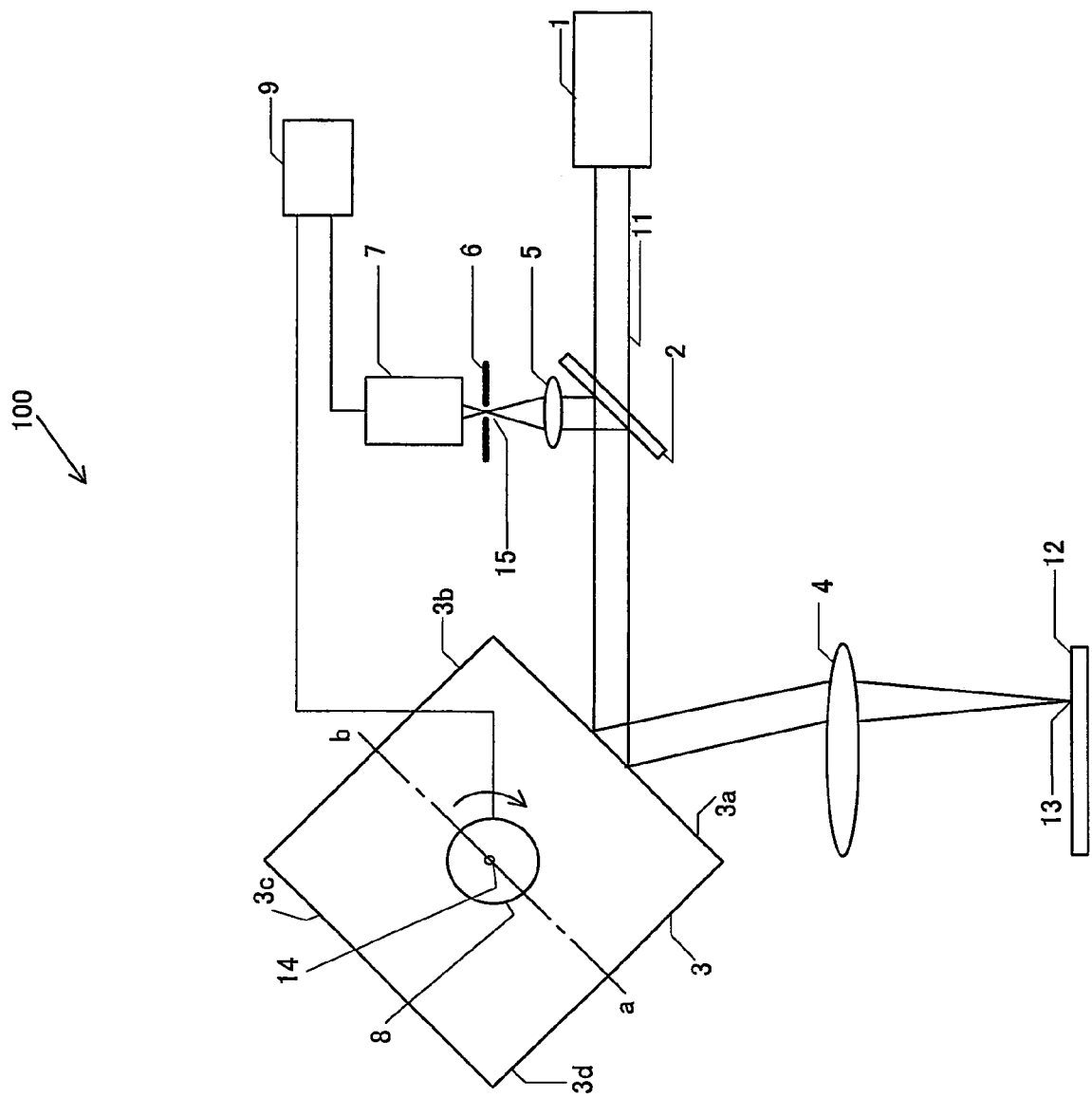
FIG. 1 shows the structure adopted in a first embodiment of the confocal microscope according to the present invention.

FIG. 1 shows the structure adopted in the first embodiment of the confocal microscope according to the present invention. A confocal microscope 100 achieved in the first embodiment comprises a light source 1, a beam splitter 2, a polygon mirror 3, a first condenser lens 4, a second condenser lens 5, a pinhole member 6, a light detection unit 7, a polygon mirror rotating device 8, a control device 9 and the like. The control device 9, which is constituted with a microcomputer and its peripheral circuits, implements various types of control on the confocal microscope 100 by executing a specific program.

The light source 1 is a laser light source. A parallel light flux 11 of laser light emitted from the light source 1 is transmitted through the beam splitter 2, is reflected at a mirror surface 3a of the polygon mirror 3 and is guided to the first condenser lens 4. The parallel laser light flux having been guided to the first condenser lens 4 is condensed onto a sample 12 via the first condenser lens 4, and forms a light spot 13 on the sample.

The polygon mirror 3 is a polygon mirror member having a plurality of mirror surfaces. The polygon mirror 3 achieved in the first embodiment includes four mirror surfaces 3a, 3b, 3c and 3d set around a rotational axis 14 in a full circle. The polygon mirror 3 is driven by the polygon mirror rotating device 8 and rotates around the rotational axis 14 at a constant speed. The polygon mirror rotating device 8, which is constituted with a motor, a motor drive circuit, a drive mechanism and the like (not shown), operates under control implemented by the control device 9 to cause the polygon mirror 3 to rotate at a constant speed.

Figure 2:
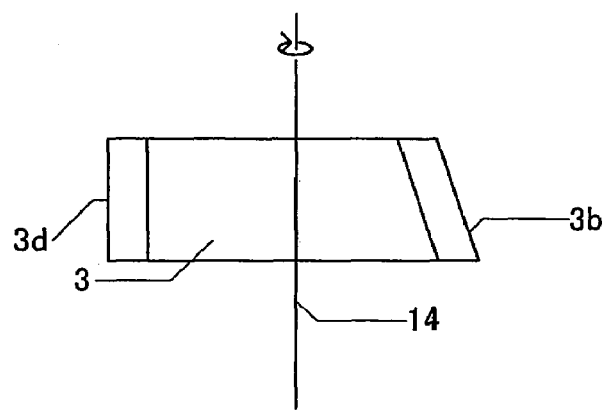
FIG. 2 is a sectional view of the polygon mirror taken along line ab in FIG. 1.

FIG. 2 is a sectional view of the polygon mirror 3 taken along line ab in FIG. 1. The mirror surface 3d is set substantially parallel to the rotational axis 14, whereas the mirror surface 3b is set at an angle relative to the rotational axis 14. The mirror surfaces 3a, 3b, 3c and 3d are disposed so that the angles they form relative to the rotational axis 14 change in sequence and are used to raster scan the sample 12 with the light spot 13 as the polygon mirror rotates.

Figure 3:
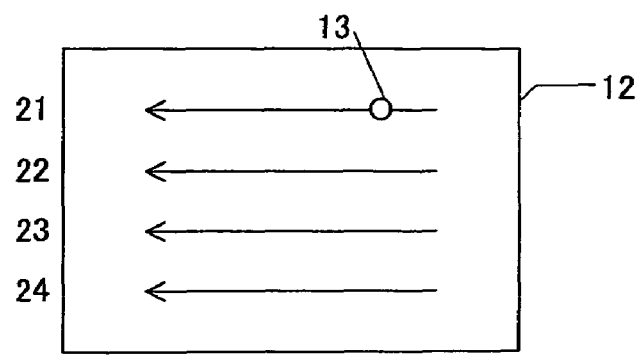
FIG. 3 illustrates how a light spot raster scans over a sample.

FIG. 3 shows how the sample 12 is raster scanned with the light spot 13. For instance, with the laser light reflected at the mirror surface 3a, the light spot 13 scans the sample 12 at its uppermost position 21 from right to left. Next, as the polygon mirror 3 rotates, the laser light is reflected at the adjacent mirror surface 3b. The mirror surface 3b is set at a tilt relative to the rotational axis 14 so that the light spot 13 scans the sample 12 at a position 22 from right to left. Then, with the laser light reflected at the mirror surface 3c, the light spot 13 scans the sample 12 at a position 23 from right to left, and with the laser light reflected at the mirror surface 3d, the light spot scans the sample 12 at a position 24 from right to left.

As described above, the mirror surfaces 3*a*, 3*b*, 3*c* and 3*d* are disposed so as to achieve angles relative to the rotational axis 14 that are slightly different from one another and enable two-dimensional scanning, i.e., raster scanning, with the light spot 13 by sequentially reflecting the light from the light source. At least three mirror surfaces among the mirror surfaces 3*a*, 3*b*, 3*c* and 3*d* are disposed at angles to achieve tilting relative to the rotational axis 14. It is to be noted that the distance between the scanning lines along which the scanning is executed at the position 21 and at the position 22 is determined by the difference between the angle formed by the mirror surface 3*a* and the rotational axis 14 and the angle formed by the mirror surface 3*b* and the rotational axis 14. The same principle applies to the distances between the other scanning lines.

The light radiated (output) through reflection or fluorescence from the area of the sample 12 having been irradiated with the light spot 13 travels through the same light path, i.e., travels through the first condenser lens 4 and the polygon mirror 3, to return to the beam splitter 2. At the polygon mirror 3, the light from the sample 12 is reflected at the mirror surface at which the light originating from the light source has been reflected. The light from the sample 12 is reflected at the beam splitter 2 and is guided to the second condenser lens 5. The second condenser lens 5 condenses the light from the sample 12 into a pinhole 15 formed at the pinhole member 6. The light from the sample 12, which is spot light on the sample 12, becomes a parallel light flux at the first condenser lens 4 and is thus guided to the second condenser lens 5 as a parallel light flux.

A single pinhole 15 is formed at the pinhole member 6 in the first embodiment. The light detection unit 7 is disposed directly behind the pinhole 15. The light detection unit 7 is constituted with a photomultiplier (PMT) or the like and detects the quantity of light condensed into the pinhole 15. The signal indicating the detected light quantity then undergo A/D conversion and are transmitted to the control device 9. Based upon the light quantity signal (data) provided by the light detection unit 7 and the rotational position information indicating the rotational position of the polygon mirror 3, the control device 9 generates a two-dimensional image of the sample 12.

The control device 9 ascertains through an arithmetic operation the rotational position of the polygon mirror 3 based upon the state of the control implemented on the polygon mirror rotating device 8. Alternatively, the rotational position of the polygon mirror 3 may be ascertained based upon a signal received from a rotational position sensor (not shown) disposed at the polygon mirror 3. Based upon the rotational position of the polygon mirror 3 thus ascertained, the control device 9 determines the two-dimensional coordinate position of the light spot 13 on the sample 12 and generates two-dimensional image data for the sample 12 by correlating the coordinate position with the light quantity data. Then, the image data thus generated are displayed at a monitor (not shown) to enable microscopic observation of the sample 12.

The following advantages are achieved with the confocal microscope 100 in the first embodiment adopting the structure described above.

(1) Since the sample can be scanned with the single polygon mirror 3, a confocal microscope with a simpler structure is provided at lower cost. In addition, since the size and shape of the pinhole can easily be changed, diverse types of samples can be observed through the confocal microscope.

(2) The light spot 13 is used for raster scanning by utilizing the polygon mirror 3 alone, having a plurality of the mirror surfaces 3*a*, 3*b*, 3*c* and 3*d* achieving angles relative to the rotational axis 14 that are different from one another. This eliminates the need for a pinhole substrate having formed therein a plurality of pinholes, and consequently, a confocal microscope adopting a simple structure and yet assuring a higher level of sectioning resolution is realized.

(3) Since only one pinhole 15 needs to be formed at the pinhole member 6, the pinhole member 6 can be manufactured more easily. In addition, since there is no need to align a plurality of condenser lenses and a plurality of pinholes, the pinhole position adjustment is facilitated.

(4) Since it is not necessary to increase the size of the pinhole in consideration of alignment error, the sectioning resolution can be kept at a high level. In other words, the pinhole 15 can be narrowed down to the diffraction limit of the light spot 13.

(5) The size of the pinhole can be altered as necessary simply by replacing the pinhole member 6 assuming a simple structure with another pinhole member. Namely, the sectioning resolution can be improved or altered easily and at low cost.

While an explanation is given above in reference to the embodiments on an example in which the polygon mirror 3 includes four mirror surfaces 3*a*, 3*b*, 3*c* and 3*d*, the present invention is not limited to this example. For instance, the polygon mirror may include 10 mirror surfaces, 20 mirror surfaces or the like. In any case, a raster scanning operation is executed over the number of times corresponding to the number of mirror surfaces while the polygon mirror rotates once.

While an explanation is given above in reference to the embodiment on an example in which the light detection unit 7 is constituted with a photomultiplier, the present invention is not limited to this example and the light detection unit may be constituted with another type of light sensor.

While an explanation is given above in reference to the embodiment on an example in which a single pinhole 15 is formed at the pinhole member 6, the present invention is not limited to this example. The pinhole member 6 may have a plurality of pinholes of varying sizes. In such a case, the size of the pinhole in use can be switched with ease simply by moving the pinhole member along the horizontal direction and the vertical direction and selecting the desirable pinhole.

Second Embodiment

Figure 4:
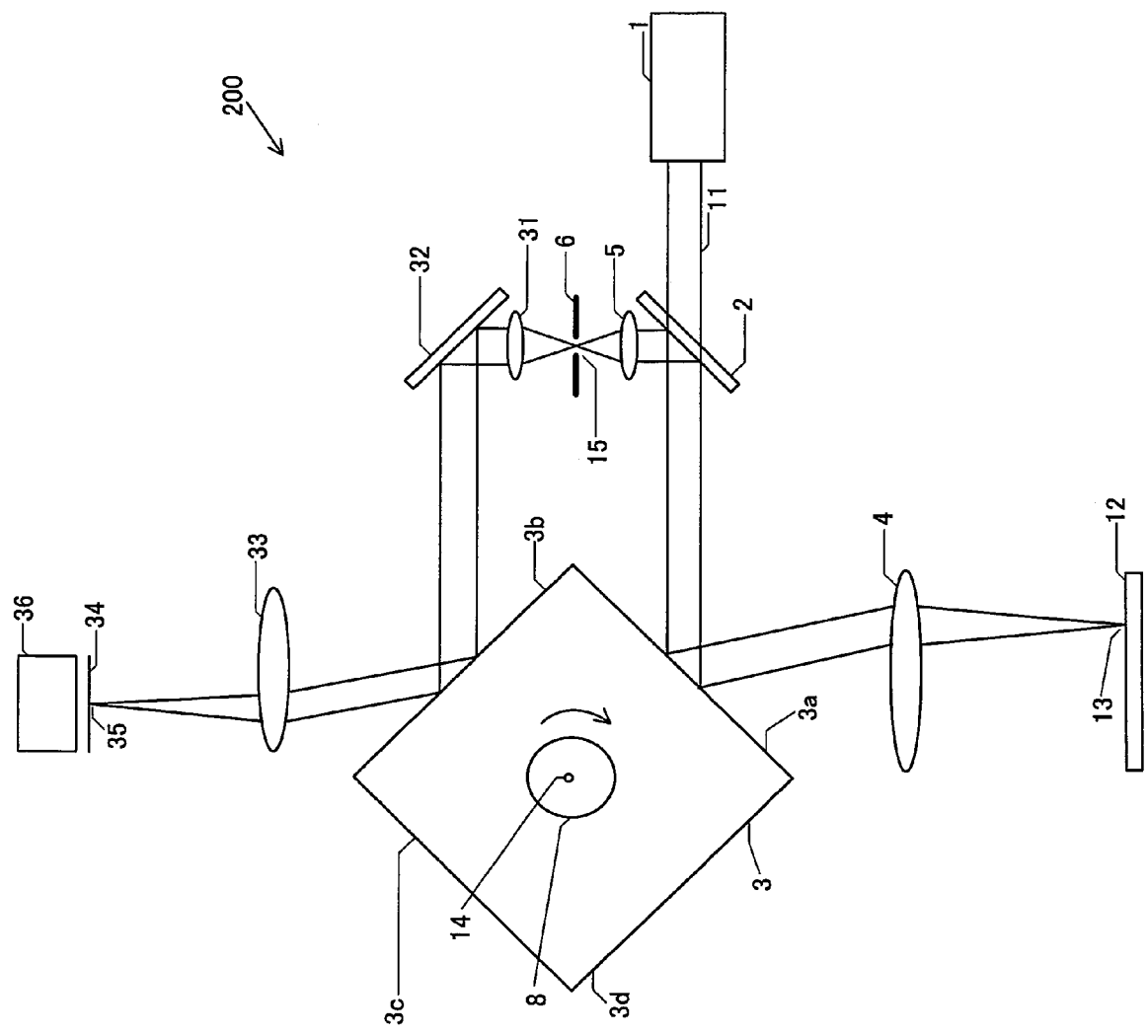
FIG. 4 shows the structure adopted in a second embodiment of the confocal microscope according to the present invention.

FIG. 4 shows the structure adopted in the second embodiment of the confocal microscope according to the present invention. The same reference numerals are assigned to components similar to those in the confocal microscope 100 achieved in the first embodiment. A confocal microscope 200 in the second embodiment differs from the confocal microscope 100 in the first embodiment in the structure adopted at stages rearward of the pinhole member 6. The following explanation focuses on the differences.

To the rear of the pinhole member 6, a collimate lens 31, a mirror 32 and an image forming lens 33 are disposed in the confocal microscope 200 achieved in the second embodiment instead of the light detection unit 7 included in the first embodiment.

The light from the sample 12, having passed through the pinhole 15, becomes a parallel light flux with the collimate lens 31, is reflected at the mirror 32 and is guided to the mirror surface 3*b* of the polygon mirror 3. The light from the sample 12, having been guided to the polygon mirror 3, is reflected at the mirror surface 3b of the polygon mirror 3 and is then guided to the image forming lens 33. The image forming lens 33 forms a light spot 35 by forming an image near a focal plane 34 with the light from the sample 12, which has become the parallel light flux and has been guided to the image forming lens 33.

Figure 5:
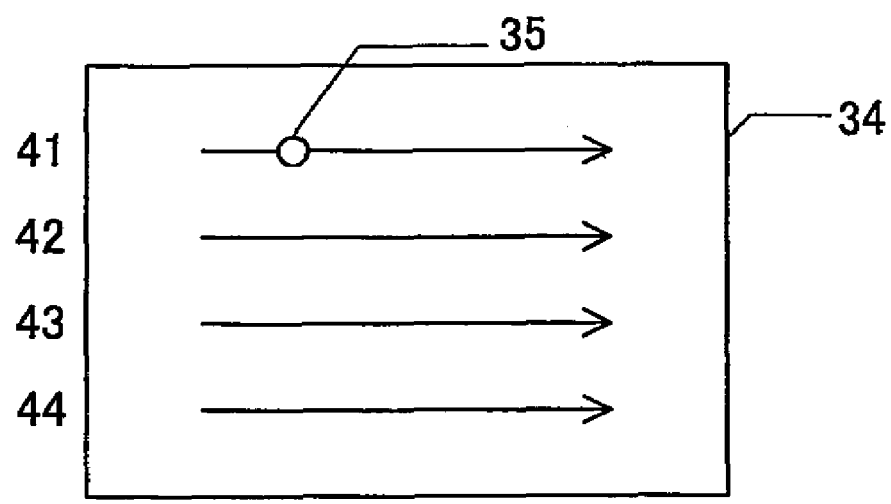
FIG. 5 shows how an image of a sample is formed as a light spot raster scans the focal plane.

In a manner similar to the light spot 13 raster scanning the sample 12, the light spot 35 raster scans the focal plane 34 to form a two-dimensional optical image of the sample 12 at the focal plane 34. FIG. 5 shows how the image of the sample 12 is formed through the raster scan over the focal plane 34 achieved with the light spot 35. The image portion of the sample 12 at the position 21 in FIG. 3 obtained through the raster scan achieved with the light reflected off the mirror surface 3a is formed at a position 42 of the focal plane 34 in FIG. 5 in the second embodiment through the raster scan achieved with the light reflected off the mirror surface 3b. Likewise, the image portion of the sample 12 at the position 22 in FIG. 3 is formed at a position 43 of the focal plane 34 in FIG. 5, the image portion of the sample 12 at the position 23 in FIG. 3 is formed at a position 44 of the focal plane 34 in FIG. 5, and the image portion of the sample 12 at the position 24 in FIG. 3 is formed at a position 41 of the focal plane 34 in FIG. 5.

The image portion of the sample 12 is formed at the focal plane along the scanning lines offset downward by one, with the image portion at the uppermost position 41 formed as a discrete image. Consequently, if the image portion at the position 41 is neglected, the remaining two-dimensional optical image of the sample 12 can be observed with the naked eye. While the polygon mirror 3 used in the embodiment has four mirror surfaces, a polygon mirror with approximately 20 mirror surfaces may instead be utilized to enable a substantially full observation of the whole image of the sample 12 even discounting the image formed along the uppermost scanning line.

In addition, the confocal microscope in the embodiment may include an image-capturing device 36 that captures the two-dimensional optical images formed on the focal plane 34. The image-capturing device 36 is a two-dimensional image-capturing sensor constituted with a CCD or the like. By executing image processing on the image data captured with the image-capturing device 36 so as to set the image data corresponding to the position 41 in FIG. 5 below the position 44, a two-dimensional image of the sample 12 can be obtained with ease.

In addition to the advantages of the confocal microscope 100 achieved in the first embodiment, the confocal microscope 200 in the second embodiment adopting the structure described above realizes the following advantages.

(1) The optical image of the sample 12 is formed on the focal plane 34 through a raster scan at the focal plane 34 by redirecting the light from the sample 12 having passed through the pinhole 15 to the polygon mirror 3. As a result, an image of the sample 12 can be observed with the confocal microscope that does not include the light detection unit 7 and the control device 9 that synthesizes an image of the sample 12 by processing the output from the light detection unit 7. In addition, an image of the sample 12 can be obtained by using a standard two-dimensional image sensor such as a digital camera. In other words, the structure does not require a special image board or control device.

While an explanation is given above in reference to the embodiment on an example in which the sample 12 and the focal plane 34 are raster scanned by using adjacent mirror surfaces, the present invention is not limited to this example and mirror surfaces distanced from each other may be used instead. While an image is formed through raster scanning along scan lines offset by one line by using adjacent mirror surfaces, the continuity of the image formed by mirror surfaces distanced from each other may be greatly disrupted. However, the whole image of the sample 12 can be obtained with ease by processing the image data provided by the image-capturing device 36 or the like in such a case.

While an explanation is given above in reference to the embodiment on an example in which the sample 12 and the focal plane 34 are raster scanned by using adjacent mirror surfaces of a single polygon mirror 3, the present invention is not limited to this example. As shown in FIG. 4A, two identical polygon mirrors 3A and 3B may be bonded to each other along the rotational axis so as to use different polygon mirrors for the raster scan of the sample 12 and the raster scan at the focal plane 34. In such a case, the two polygon mirrors should be bonded with an offset along the rotating direction so that the mirror surface used for the raster scan of the sample 12 and the mirror surface used for the raster scan at the focal plane 34 tilt with equal angles relative to the rotational axis. By adopting this structure, a normal whole optical image of the sample 12 is formed at the focal plane 34.

While an explanation is given above in reference to the embodiment on an example in which the sample 12 and the focal plane 34 are raster scanned by using adjacent mirror surfaces of the polygon mirror 3, the present invention is not limited to this example and the sample 12 and the focal plane 34 may instead be raster scanned by using the same mirror surface. In the latter case, the positions of the beam splitter 2, the pinhole member 6, the collimate lens 31 and the mirror 32 should be adjusted so as to enable the use of a single mirror surface. For instance, the beam splitter 2 may be disposed so as to guide the light from the sample 12 along the direction perpendicular to the drawing sheet surface on which FIG. 4 is drawn and the positions of the other components should be adjusted accordingly. This structure, as well as the structure having two polygon mirrors bonded together described above, enables the formation of a normal whole optical image of the sample 12 at the focal plane 34.

Third Embodiment

Figure 6:
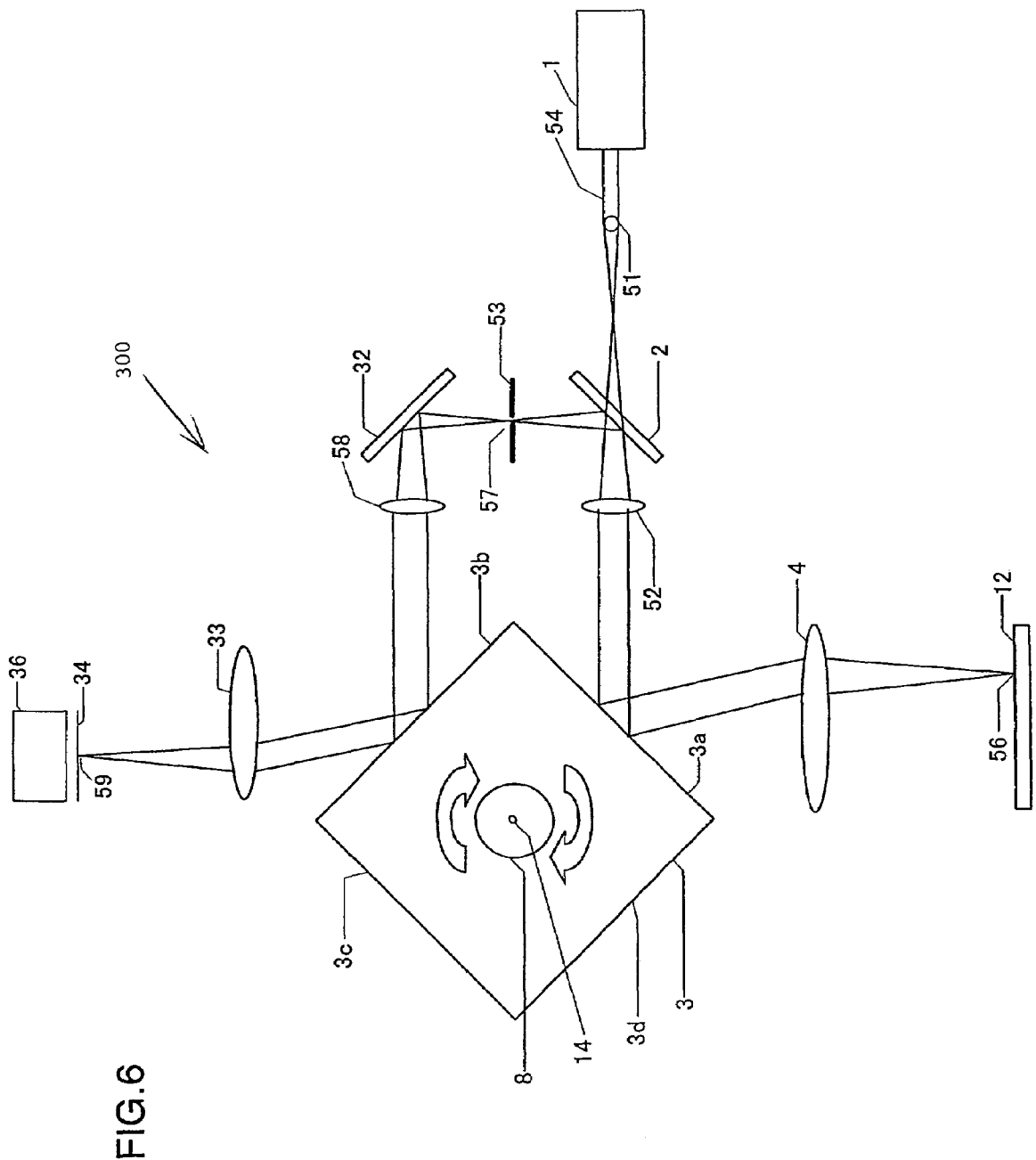
FIG. 6 shows the structure adopted in a third embodiment of the confocal microscope according to the present invention.

FIG. 6 shows the structure adopted in the third embodiment of the confocal microscope according to the present invention. The same reference numerals are assigned to components similar to those in the confocal microscope 200 achieved in the second embodiment. A confocal microscope 300 achieved in the third embodiment differs from the confocal microscope 200 in the second embodiment in that it includes a micro lens group 51, a lens 52, a pinhole member 53, a collimate lens 58 and the like. The following explanation focuses on the differences.

Figure 7:
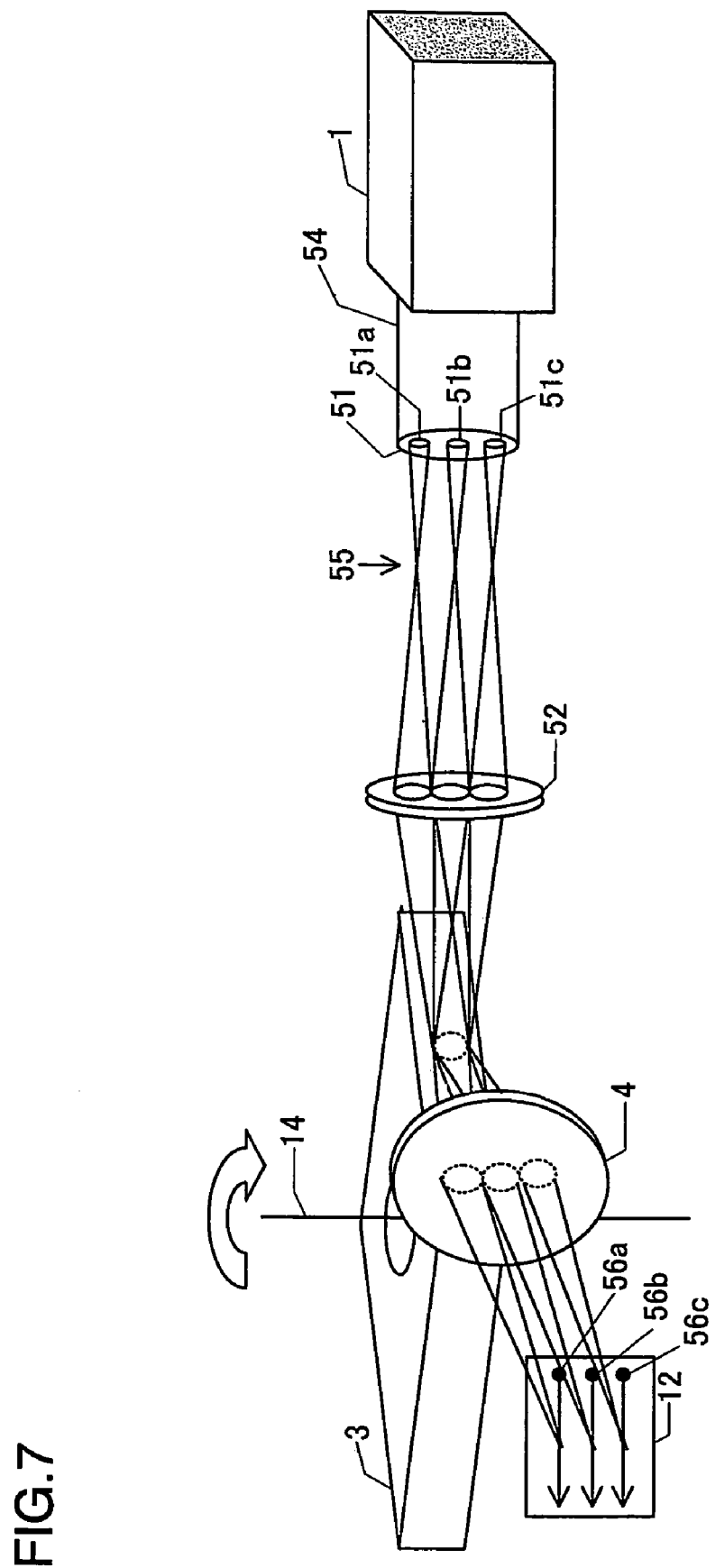
FIG. 7 is a perspective showing how a plurality of light spots are formed on the sample with light originating from the light source and traveling via the micro lens group, the lens, the polygon mirror and the first condenser lens.

FIG. 7 is a perspective showing how light from the light source 1, having traveled through the micro lens group 51, the lens 52, the polygon mirror 3 and the first condenser lens 4, forms a plurality of light spots 56 on the sample 12. The micro lens group 51 includes three micro lenses 51a, 51b and 51c disposed parallel to the rotational axis 14 of the polygon mirror 3. A light flux 54 emitted from the light source 1 is condensed at a position 55 through the plurality of micro lenses 51a, 51b and 51c at the micro lens group 51. The light having been condensed at the position 55 becomes parallel light fluxes with the lens 52, which are then reflected at the polygon mirror 3 and guided to the first condenser lens 4. The three parallel laser light fluxes having been guided to the first condenser lens 4 are condensed and form three light spots 56 (56a, 56b and 56c) on the sample 12 through the first condenser lens 4.

Figure 8:
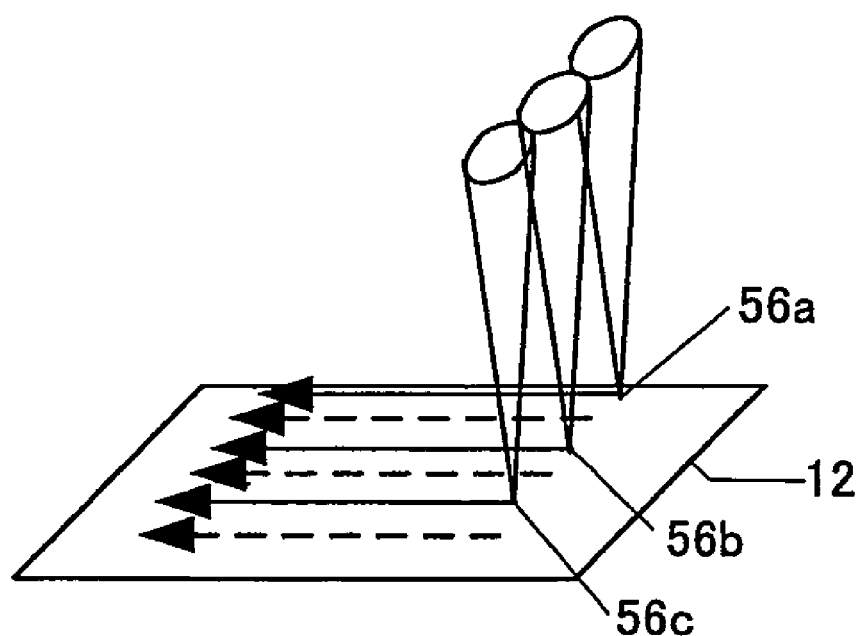
FIG. 8 shows how raster scanning is achieved with three light spots.

As in the first embodiment and the second embodiment, the polygon mirror 3 is a polygon mirror member having a plurality of mirror surfaces. As the polygon mirror 3 rotates, a raster scan is executed with the three light spots 56a, 56b and 56c. FIG. 8 shows how the raster scan is achieved with the three light spots 56a, 56b and 56c.

The raster scan is executed with the light spots 56a, 56b and 56c so as to fill the gaps between the individual light spots 56a, 56b and 56c. For instance, FIG. 8 indicates the scan achieved by using the mirror surface 3a of the polygon mirror 3 with the solid line and indicates the scan achieved by using the next mirror surface 3b with a dotted line directly under the solid line. Through the scan achieved by using the next mirror surfaces 3c and 3d, the gap between the light spots 56a and 56b, the gap between the light spots 56b and 56c and the gap between the light spot 56c and the bottom end in FIG. 8 are interpolated.

In other words, as the operation shifts from the scan with the mirror surface 3a to the scan with the mirror surface 3b, the scanning line shifts down by one in FIG. 8, and this shift occurs over a distance shorter than the length of the gaps between the individual light spots 56a, 56b and 56c. More specifically, the distance over which the scanning line shifts should be set to a value obtained by dividing the length of the gaps between the individual light spots 56a, 56b and 56c by the number of mirror surfaces at the polygon mirror 3. The mirror surfaces 3a, 3b, 3c and 3d at the polygon mirror 3 are set at different angles relative to the rotational axis 14 so as to enable such a raster scan.

The light radiated (output) through reflection or fluorescence from the areas of the sample 12 having been irradiated with the individual light spots 56a, 56b and 56c travels through the same light path, i.e., through the first condenser lens 4, the polygon mirror 3 and the lens 53, to return to the beam splitter 2. The light from the sample 12 is reflected at the beam splitter 2 and is guided to pinholes 57 at the pinhole member 53. At the pinhole member 53, three pinholes 57 are formed parallel to the rotational axis 14 of the polygon mirror 3 at positions that are conjugate with the three light spots 56a, 56b and 56c. The lens 52 condenses the three parallel light fluxes from the sample 12, each into one of the three pinholes 57 at the pinhole member 53.

The light from the sample 12 having passed through the three pinholes 57 is reflected at the mirror 32 and is guided to the collimate lens 58. At the collimate lens 58, the light from the sample 12 having passed through the three pinholes 57 becomes parallel light fluxes, which are then guided to the mirror surface 3b of the polygon mirror 3. The light from the sample 12 having been guided to the polygon mirror 3 is reflected at the mirror surface 3b of the polygon mirror and is guided to the image forming lens 33. The image forming lens 33 forms three light spots 59 by forming images near the focal plane 34 with the three parallel light fluxes from the sample 12 having been guided to the image forming lens 33.

Just as a raster scan is achieved with the light spots 56 on the sample 12, a raster scan is achieved at the focal plane 34 with the three light spots 59, forming a two-dimensional optical image of the sample 12 at the focal plane 34, as has been explained in reference to the second embodiment. In addition, the image-capturing device 36 is utilized to capture the two-dimensional optical image formed at the focal plane 34.

The micro lenses 51a, 51b and 51c are disposed substantially parallel to the rotational axis 14 of the polygon mirror 3 and thus, the condensed light and the parallel light fluxes advancing on the light path, too, are formed substantially parallel to the rotational axis 14 of the polygon mirror 3. In addition, the three light spots 56 formed on the sample 12 and the three light spots 59 formed on the focal plane 34, too, are positioned substantially parallel to the rotational axis 14 of the polygon mirror 3.

In addition to the advantages of the confocal microscope 100 and the confocal microscope 200 in the first and second embodiments, the confocal microscope 300 in the third embodiment adopting the structure described above achieves the following advantages.

(1) Since a raster scan is executed by forming a plurality of light spots on the sample 12, the sample 12 can be raster scanned along a large number of scanning lines. As a result, an optical image achieving a high level of resolution can be obtained speedily. This means that any quick changes occurring at the sample can be observed accurately through the confocal microscope adopting a simple structure.

(2) After the polygon mirror 3 rotates once, the scanning lines shift by one stage in a comb-like pattern. In other words, the raster scan proceeds so as to interpolate the gaps between the scanning lines along which the scan is executed with the plurality of light spots. Thus, the whole image of the sample 12 can be observed even before the polygon mirror 3 completes a full rotation.

While an explanation is given above in reference to the embodiment on an example in which three light spots are formed by using three micro lenses, the present invention is not limited to this example. For instance, four or more light spots may be formed by using four or more micro lenses.

While an explanation is given above in reference to the embodiment on an example in which a plurality of light spots are formed by using micro lenses, the present invention is not limited to this example. Instead of using micro lenses or the like, semiconductor lasers disposed in an array may be used.

An explanation is given above in reference to the embodiment on an example in which a plurality of light spots are simply formed by using micro lenses. Instead, the light spots may be formed with different colors (wavelengths) of light, such as red, blue and green. In addition, a single light spot may be formed with light of a given wavelength superimposed over light of another wavelength.

While an explanation is given above in reference to the embodiment on an example in which the pinhole member 53 includes three pinholes 57 formed therein, the present invention is not limited to this example. The three pinholes set along the direction perpendicular to the drawing sheet on which FIG. 6 is drawn may be replaced by a plurality of pinhole groups with different sizes of pinholes set in sequence along the left/right direction in the drawing sheet. In such a case, the size of the pinhole can be altered with ease simply by moving the pinhole member to the left or to the right.

While the confocal microscope achieved in the embodiment adopts a structure similar to the structure of the confocal microscope in the second embodiment, the concept of the embodiment may be adopted in the confocal microscope in the first embodiment as well. In such a case, a plurality of light detection units will be required in correspondence to the plurality of pinholes. In other words, a plurality of light beams will be radiated onto the sample simultaneously, and the plurality of light beams from the sample will then be made to pass through the plurality of pinholes each corresponding to one of the plurality of light beams. The light beams having passed through the plurality of pinholes are then simultaneously detected with a plurality of light detectors. The light detectors may be one-dimensional linear sensors or photomultipliers. By irradiating the sample with a plurality of light beams at once and detecting the plurality of light beams at the same time, the length of time required for the measurement can be reduced.

The above described embodiments are examples, and various modifications can be made without departing from the spirit and scope of the invention.

What is claimed is:

1. A confocal microscope comprising:
   a first condenser optical system that condenses light from a light source onto a sample;
   a pinhole member having a pinhole;
   a second condenser optical system that condenses light from the sample into the pinhole;
   a polygon mirror having a plurality of mirror surfaces achieving angles relative to a rotational axis different from one another and formed so as to surround the rotational axis in a full circle, which is disposed between the first condenser optical system and the pinhole; and
   a first optical system that separates the light from the light source and the light from the sample and guides the light from the sample departing the polygon mirror to the pinhole; wherein:
   the polygon mirror rotates around the rotational axis at a constant speed, sequentially reflects the light from the light source at the plurality of mirror surfaces and guides the reflected light to the first condenser optical system, and two-dimensionally scans the sample with the light condensed onto the sample by the first condenser optical system;
   the first condenser optical system guides the light from the sample to the polygon mirror; and
   the polygon mirror reflects the light from the sample departing the first condenser optical system at a mirror surface matching a mirror surface at which the light from the light source has been reflected, and guides the reflected light to the second condenser optical system; and further comprising:
   a light detector that detects the light condensed at the pinhole; and
   a sample image generating device that generates a two-dimensional image of the sample based upon the light detected by the light detector and a rotational position of the polygon mirror; wherein:
   a plurality of condensed light spots are formed on the sample with the light from the light source; and
   the pinhole member includes a plurality of pinholes each used in correspondence to one of the plurality of condensed light spots; and wherein:
   the polygon mirror is structured so that when a scan achieved with the plurality of condensed light spots shifts by one stage as the polygon mirror rotates and light reflection switches from a mirror surface to an adjacent mirror surface, the plurality of condensed light spots shift by an extent represented by a distance smaller than a distance between adjacent condensed light spots.

2. A confocal microscope comprising:
   a first condenser optical system that condenses light from a light source onto a sample;
   a pinhole member having a pinhole;
   a second condenser optical system that condenses light from the sample into the pinhole;
   a polygon mirror having a plurality of mirror surfaces achieving angles relative to a rotational axis different from one another and formed so as to surround the rotational axis in a full circle, which is disposed between the first condenser optical system and the pinhole; and
   a first optical system that separates the light from the light source and the light from the sample and guides the light from the sample departing the polygon mirror to the pinhole; wherein:
   the polygon mirror rotates around the rotational axis at a constant speed, sequentially reflects the light from the light source at the plurality of mirror surfaces and guides the reflected light to the first condenser optical system, and two-dimensionally scans the sample with the light condensed onto the sample by the first condenser optical system;
   the first condenser optical system guides the light from the sample to the polygon mirror; and
   the polygon mirror reflects the light from the sample departing the first condenser optical system at a mirror surface matching a mirror surface at which the light from the light source has been reflected, and guides the reflected light to the second condenser optical system, and further comprising:
   a second optical system that guides the light from the sample, having passed through the pinhole, to the polygon mirror; and
   a third condenser optical system that condenses the light from the sample, having passed through the pinhole and having been guided from the polygon mirror, onto a specific plane; wherein:
   the polygon mirror sequentially reflects the light from the sample, guided back to the polygon mirror from the second optical system after passing through the pinhole, at the plurality of mirror surfaces and guides the reflected light to the third condenser optical system as the polygon mirror rotates, so as to enable a two-dimensional scan of the specific plane with the light condensed onto the specific plane by the third condenser optical system and optically generate a two-dimensional image of the sample on the specific plane;
   the polygon mirror reflects the light from the light source and the light from the sample at a same mirror surface; and wherein:
   a plurality of condensed light spots are formed on the sample with the light from the light source; and
   the pinhole member includes a plurality of pinholes each used in correspondence to one of the plurality of condensed light spots.

3. A confocal microscope according to claim 2, wherein:
   the plurality of condensed light spots and the plurality of pinholes are set substantially parallel to the rotational axis of the polygon mirror.

4. A confocal microscope according to claim 2, wherein:
   the polygon mirror is structured so that when a scan achieved with the plurality of condensed light spots shifts by one stage as the polygon mirror rotates and light reflection switches from a mirror surface to an adjacent mirror surface, the plurality of condensed light spots shift by an extent represented by a distance smaller than a distance between adjacent condensed light spots.

5. A confocal microscope comprising:

a first condenser optical system that condenses light from a light source onto a sample;

a pinhole member having a pinhole;

a second condenser optical system that condenses light from the sample into the pinhole;

a polygon mirror having a plurality of mirror surfaces achieving angles relative to a rotational axis different from one another and formed so as to surround the rotational axis in a full circle, which is disposed between the first condenser optical system and the pinhole; and a first optical system that separates the light from the light source and the light from the sample and guides the light from the sample departing the polygon mirror to the pinhole; wherein:

the polygon mirror rotates around the rotational axis at a constant speed, sequentially reflects the light from the light source at the plurality of mirror surfaces and guides the reflected light to the first condenser optical system, and two-dimensionally scans the sample with the light condensed onto the sample by the first condenser optical system;

the first condenser optical system guides the light from the sample to the polygon mirror; and the polygon mirror reflects the light from the sample departing the first condenser optical system at a mirror surface matching a mirror surface at which the light from the light source has been reflected, and guides the reflected light to the second condenser optical system; and further comprising:

a second optical system that guides the light from the sample, having passed through the pinhole, to the polygon mirror; and a third condenser optical system that condenses the light from the sample, having passed through the pinhole and having been guided from the polygon mirror, onto a specific plane; wherein:

the polygon mirror sequentially reflects the light from the sample, guided back to the polygon mirror from the second optical system after passing through the pinhole, at the plurality of mirror surfaces and guides the reflected light to the third condenser optical system as the polygon mirror rotates, so as to enable a two-dimensional scan of the specific plane with the light condensed onto the specific plane by the third condenser optical system and optically generate a two-dimensional image of the sample on the specific plane; and wherein:

the polygon mirror includes two mirror surface sets disposed along the rotational axis, each having a plurality of mirror surfaces set so as to surround the rotational axis in a full circle, incoming light from the light source is reflected at a mirror surface in a first set and the light from the sample is reflected at a mirror surface in a second set, with the first set and the second set coupled so as to offset the plurality of mirror surfaces in the first set and the plurality of mirror surfaces in the second set along a rotational direction to use mirror surfaces in the first set and the second set achieving angles equal to each other relative to the rotational axis.

6. A confocal microscope comprising:

a first condenser optical system that condenses light from a light source onto a sample;

a pinhole member having a pinhole;

a second condenser optical system that condenses light from the sample into the pinhole;

a polygon mirror having a plurality of mirror surfaces achieving angles relative to a rotational axis different from one another and formed so as to surround the rotational axis in a full circle, which is disposed between the first condenser optical system and the pinhole; and a first optical system that separates the light from the light source and the light from the sample and guides the light from the sample departing the polygon mirror to the pinhole; wherein:

the polygon mirror rotates around the rotational axis at a constant speed, sequentially reflects the light from the light source at the plurality of mirror surfaces and guides the reflected light to the first condenser optical system, and two-dimensionally scans the sample with the light condensed onto the sample by the first condenser optical system;

the first condenser optical system guides the light from the sample to the polygon mirror; and the polygon mirror reflects the light from the sample departing the first condenser optical system at a mirror surface matching a mirror surface at which the light from the light source has been reflected, and guides the reflected light to the second condenser optical system; and further comprising:

a second optical system that guides the light from the sample, having passed through the pinhole, to the polygon mirror; and a third condenser optical system that condenses the light from the sample, having passed through the pinhole and having been guided from the polygon mirror, onto a specific plane; wherein:

the polygon mirror sequentially reflects the light from the sample, guided back to the polygon mirror from the second optical system after passing through the pinhole, at the plurality of mirror surfaces and guides the reflected light to the third condenser optical system as the polygon mirror rotates, so as to enable a two-dimensional scan of the specific plane with the light condensed onto the specific plane by the third condenser optical system and optically generate a two-dimensional image of the sample on the specific plane; and wherein:

a plurality of condensed light spots are formed on the sample with the light from the light source; and the pinhole member includes a plurality of pinholes each used in correspondence to one of the plurality of condensed light spots.

7. A confocal microscope according to claim 6, wherein:

the plurality of condensed light spots and the plurality of pinholes are set substantially parallel to the rotational axis of the polygon mirror.

* * * * *